United States Patent
Garner et al.

[19]

[11] 3,895,589

[45] July 22, 1975

[54] SEED PLANTING APPARATUS

[75] Inventors: Thomas H. Garner, Seneca; Byron K. Webb, Clemson, both of S.C.

[73] Assignee: Cotton Incorporated, New York, N.Y.

[22] Filed: Sept. 13, 1973

[21] Appl. No.: 396,674

[52] U.S. Cl. .................................. 111/7; 111/85
[51] Int. Cl. ............................................ A21c 23/02
[58] Field of Search ........ 111/85, 6, 7, 86; 172/700, 172/722, 145, 146, 195

[56] References Cited
UNITED STATES PATENTS

| | | | |
|---|---|---|---|
| 2,849,969 | 9/1958 | Taylor | 111/7 |
| 3,162,152 | 12/1964 | Regenstein, Jr. et al. | 111/7 |
| 3,180,290 | 4/1965 | Kappelmann et al. | 111/85 |
| 3,295,480 | 1/1967 | Haynes | 111/6 |
| 3,367,293 | 2/1968 | Cox | 111/6 |
| 3,581,685 | 6/1971 | Taylor | 111/7 |
| 3,605,657 | 9/1971 | Brannan | 111/85 X |
| 3,618,538 | 11/1971 | Brannan | 111/7 |

*Primary Examiner*—Stephen C. Pellegrino
*Attorney, Agent, or Firm*—Burns, Doane, Swecker & Mathis

[57] ABSTRACT

A seed planter with means for injecting liquid solutions into the soil while planting the seeds. The implement includes a frame which is adapted to be mounted behind a tractor. A hopper is mounted on the frame and a shank extends downwardly from the hopper to support a sweep at the lower end of the shank. The sweep is wedge shaped at the forward end and has an opening provided at the rearward end. A spray nozzle is mounted inside the sweep and positioned to spray a liquid solution rearwardly through the opening. A seed trench is formed by a runner opener at the lower end of the shank in front of the sweep. A seed guide extends downwardly through the interior of the shank and is aligned with an opening in the bottom of the sweep behind the opener. Tines along the rearward portion of the sweep above the opening allow increased penetration of the spray from the nozzle into the soil. Flanges on the bottom of the sweep close and compact the soil over the seed. A gauge wheel on the implement frame meters the supply of seeds from the hopper. A liquid storage container may be mounted on the frame and connected with a conduit extending through the shank to supply liquid to the nozzle in the sweep.

10 Claims, 9 Drawing Figures

PATENTED JUL 22 1975

SHEET 1

3,895,589

SEED PLANTING APPARATUS

BACKGROUND OF THE INVENTION

This invention relates to agricultural implements, and more particularly to a seed planter adapted for spraying liquid into the soil while the seeds are being planted.

Under certain conditions, it has been found desirable to inject pesticides, liquid fertilizers, or other liquid chemical solutions into the soil below the surface to improve crop yields. One common method of injecting such liquids into the soil is to provide a sharpened point on the lower end of a shank and a tube extending down the shank behind the point. As the point is moved forwardly through the soil, it opens a furrow and liquid conducted downwardly through the tube soaks into the soil in the furrow. This arrangement does not disperse the liquid laterally into the soil and the liquid is concentrated in a narrow band. When a pesticide is used, efficient pest control requires that the pesticide be placed in a precise relationship to the planted seed. If the pesticide is applied after the seed has been planted, it is difficult to assure that the pesticide will be injected at the proper location. Also, the subsequent application of the pesticide requires a separate field operation.

One method of applying pesticide is to spray the surface of the ground before or after the seeds have been planted. Usually, the pesticide is atomized in small spray droplets which tend to drift, so that the pesticide is not uniformly distributed in the desired location. The small droplets are necessary for adequate coverage at low volumes of liquid. If the spray is not atomized into fine droplets, it is necessary to transport large volumes of the liquid, thereby increasing handling costs.

SUMMARY OF THE INVENTION

In view of the deficiencies of prior apparatus for injecting liquids into the soil, it is an object of this invention to provide an implement for efficiently injecting pesticide into the soil in a predetermined relationship to the planted seed.

A further object of the invention is to provide apparatus for injecting liquid into the soil at a relatively low volume rate, while providing a wide dispersion of the liquid into the soil.

These objects are accomplished in accordance with a preferred embodiment of the invention by a seed planting implement which includes a sweep and a supporting shank. The sweep extends laterally on both sides of the shank and the forward portion of the sweep is wedge shaped to lift the soil as the implement is drawn forwardly. The depth of the sweep is controlled by a gauge wheel which rides on the surface of the ground. Preferably, the sweep is provided with a runner opener which pushes crop residues and trash upwardly and which forms a small seed trench under the sweep. The seed is conducted from a hopper at the upper end of the shank through the interior of the shank and into the seed trench through an aperture in the bottom of the sweep.

The rearward side of the sweep has an opening and a spray nozzle is mounted in the interior of the sweep for directing a spray outwardly through the opening. A tube extending through the interior of the shank connects the nozzle with a liquid supply tank at the upper end of the shank. Preferably, tines are mounted on the sweep above the opening and project rearwardly to break up the soil as it falls behind the sweep, thereby dispersing the liquid spray into the soil.

The performance of the seed planting implement is enhanced when combined with a coulter and bed leveling sweep in front of the implement and a bed finishing sweep behind the implement.

DESCRIPTION OF THE DRAWINGS

This preferred embodiment of the invention is illustrated in the accompanying drawings in which.

DESCRIPTION OF THE PREFERRED EMBODIMENT

Figure 1:
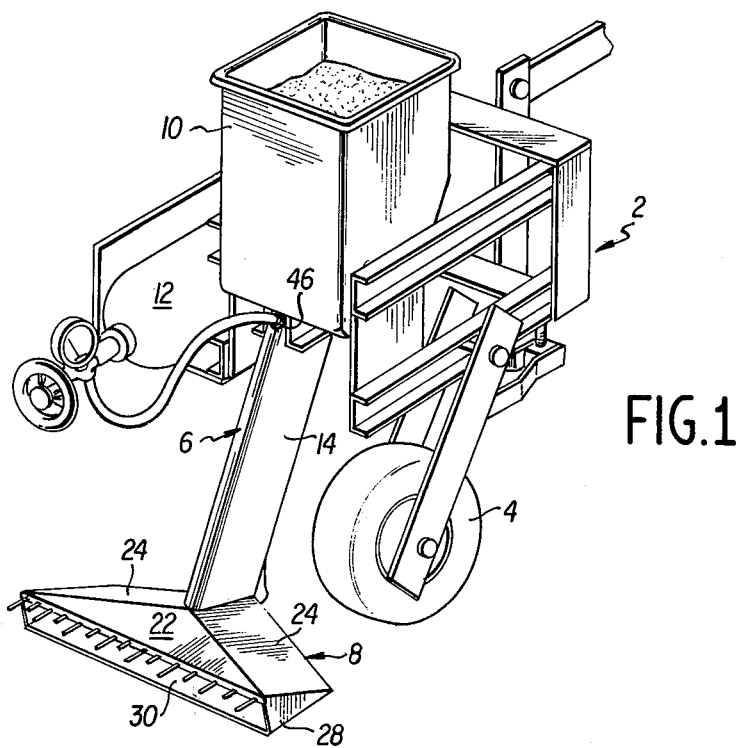
FIG. 1 is a perspective view of the apparatus of this invention.

Referring to FIG. 1, the apparatus includes a frame 2 which is adapted to be connected by a conventional linkage to the rear of a tractor. The height of the frame 2 above the ground is controlled by a gauge wheel 4 which is suspended from the frame 2. A shank 6 is rigidly mounted on the frame 2 at its upper end. A sweep 8 is secured on the lower end of the shank 6. The frame 2 also supports a seed hopper 10. A liquid supply tank 12 may be mounted on the frame 2 or at some other convenient location.

Figure 2:
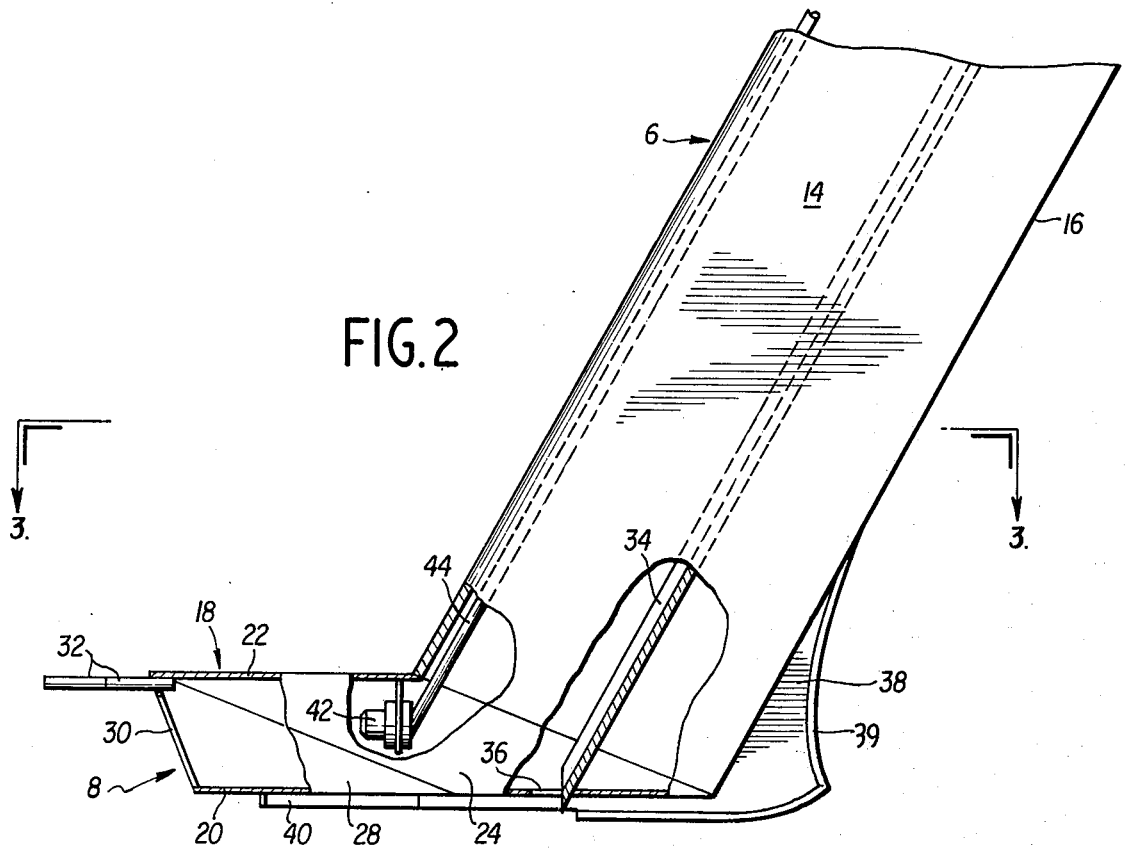
FIG. 2 is a side elevational view, partially in cross-section, of the shank and sweep.
Figure 3:
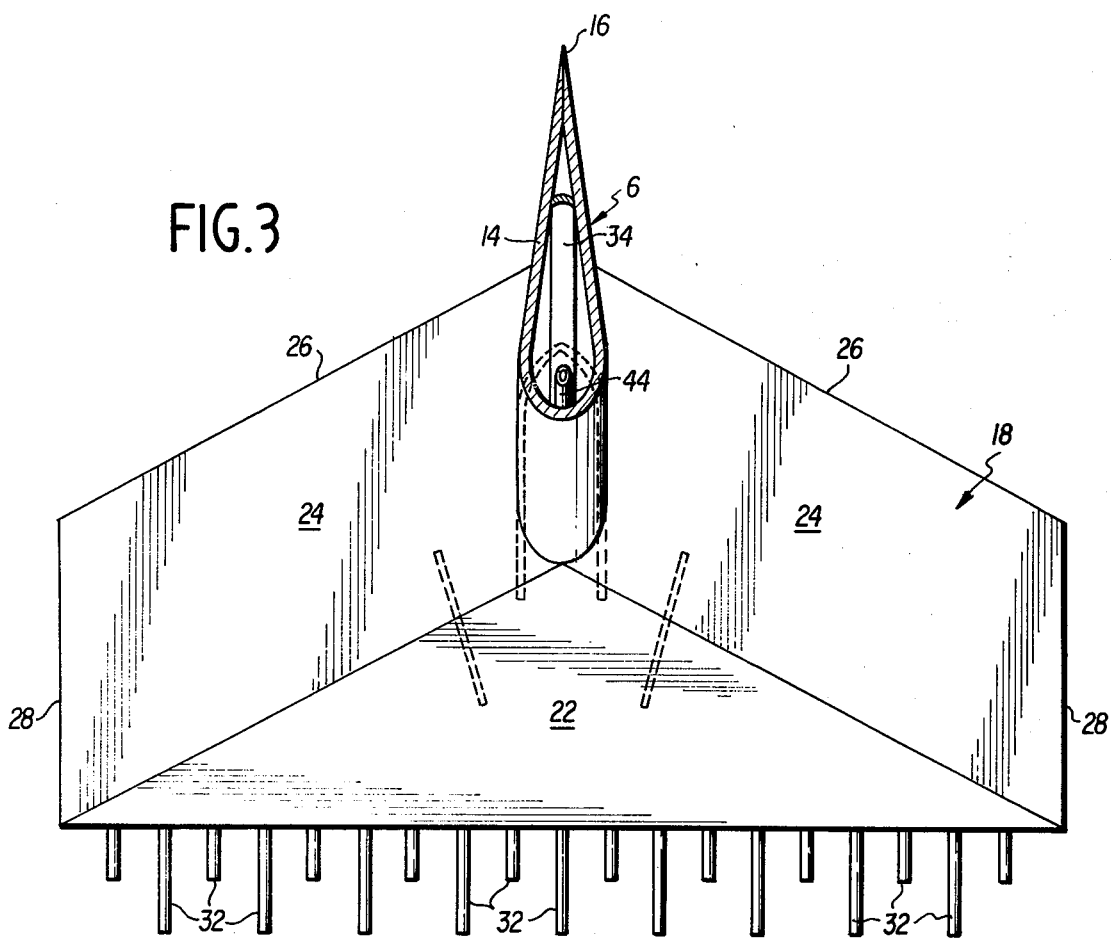
FIG. 3 is a cross-sectional view of the apparatus along the Line 3—3 in FIG. 2.

The shank 6 has opposite side walls 14 which are spaced apart from each other and converge at the forward edge 16 of the shank 6. The edge 16 is preferably pointed to reduce the resistance to movement of the shank through the soil. The shank 14 is inclined rearwardly, as shown in FIG. 2.

The sweep 8 is secured at the lower end of the shank 6 and has a top wall 18 and a bottom wall 20. The bottom wall is substantially flat and intersects the forward edge 16 of the shank 14. The top wall 18 includes a rearward portion 22 which is substantially flat and parallel to the bottom wall 20. The top wall 18 also includes wedge portions 24 which intersect the bottom wall 20 along the forward edge 26 of the sweep 8. End walls 28 cooperate with the rearward portion 22 and the bottom wall 20 to define a rearward opening 30. A plurality of tines 32 are secured along the rearward edge of the top portion 22 above the opening 30.

Figure 5:
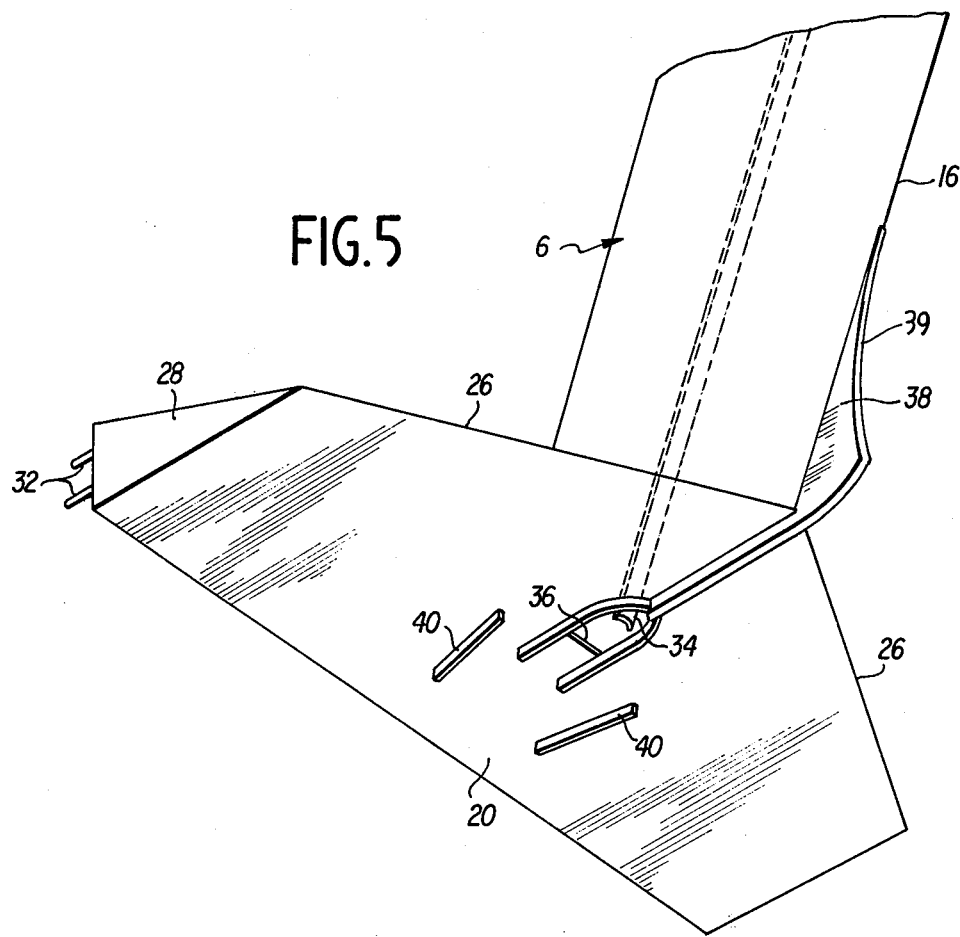
FIG. 5 is a perspective view showing the bottom of the sweep and the lower portion of the shank.

Seeds are dispensed from the hopper 10 by conventional means and are conducted through the interior of the shank 6 along a seed guide 34. The seed guide 34 extends through the front portion of the sweep 8 and terminates at an aperture 36 in the bottom wall 20 (FIG. 5). A runner opener 38 is secured along the forward edge 16 and extends along the bottom 20 in alignment with the aperture 36. The runner opener, as shown in FIG. 2, has an upwardly inclined edge 39 which forces the previous crop residues and weed trash to be brought to the surface of the ground, where it is more easily removed from the sweep by soil flow. The opener forms a trench for receiving the seeds that fall through the aperture 36. Flanges 40 on the bottom wall 20 close the soil over the seed and compact the soil lightly as the sweep moves forwardly through the soil.

Figure 4:
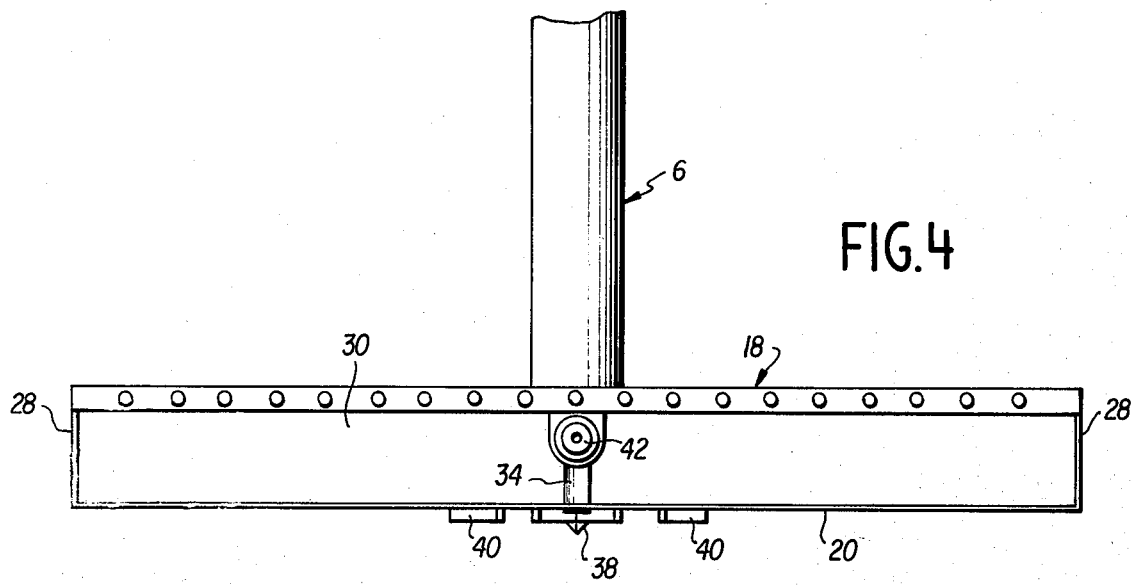
FIG. 4 is a rear elevational view of the lower portion of the shank and the sweep.

A liquid spray nozzle 42 (FIG. 2) is mounted on a bracket in the interior of the sweep 8 adjacent the lower end of the shank 6. The nozzle 42 is positioned in alignment with the shank 6, as shown in FIG. 4. A tube 44 is mounted in the interior of the shank 6 and communicates at its lower end with the nozzle 42 and at its upper end with a fitting 46 (FIG. 1) adapted for connection with the supply cylinder 12. The spray nozzle 42 is positioned for directing a spray of liquid outwardly through the opening 30.

Figure 6:
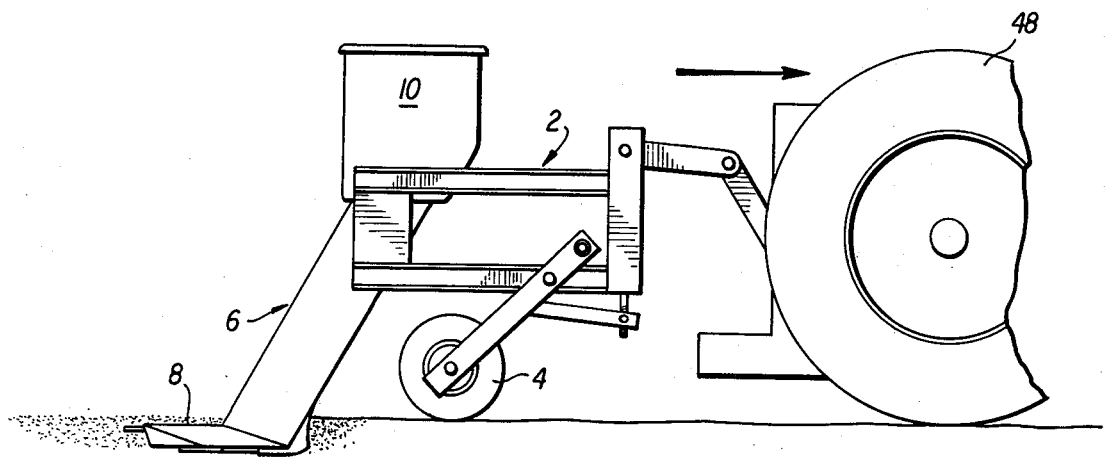
FIG. 6 is a side elevational view, partially schematic, showing the apparatus of this invention in operation.

In operation, the frame 2 is attached to the rear of a tractor 48, as shown schematically in FIG. 6. The gauge wheel 4 rolls along the surface of the ground and controls the depth of the sweep 8. As the sweep advances through the soil, the forward edge 26 cuts through the soil and displaces the soil upwardly along the wedge surfaces 24. The opener 38 forms a seed trench under the bottom surface 20, and seeds are dispensed periodically from the hopper 10 and pass along the seed guide 34 and through the aperture 36 where they are deposited in the trench. The flanges 40 continuously close and compact the soil over the seed as the sweep advances.

Liquid under pressure is supplied to the tube 44, and the liquid is sprayed outwardly by the nozzle 42 through the opening 30. As the sweep advances, the soil falls over the rearward edge of the flat portion 22, where it is contacted by the spray from the nozzle 42. The tines 32 help to break up the soil and improve the dispersion of the liquid into the soil.

The seed planter of this invention permits the application of pesticides or other liquid amendment materials to be combined with the planting of seeds in a single field operation. The pesticide is applied at the proper location relative to the seed, and may be applied at shallow depths. Since the liquid spray occurs within the sweep 8, small spray droplets do not drift. By varying the pressure of the liquid being sprayed by the nozzle 42, and by removing some or all of the tines 32, the degree of penetration of the spray can be adjusted.

The arrangement of the opener 38 and the flanges 40 permits the soil to be compacted at the seed level to promote moisture retention. The layer of soil above the seed level remains loose, thereby minimizing restriction of growth of the seedling and breaking moisture capillaries in the soil which results in less moisture loss from the seed zone. Also, the shank 6 and sweep 8 prevent the dry surface soil from falling into the seed trench before the trench is closed by the flanges 40.

Figure 7:
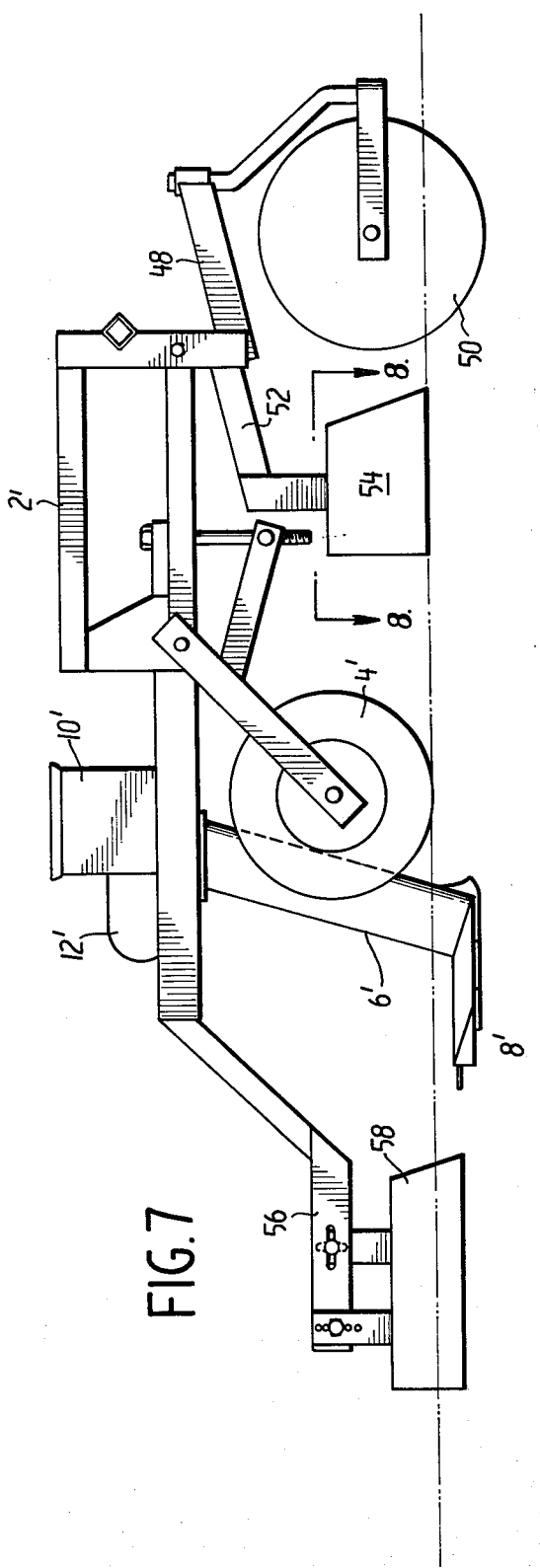
FIG. 7 is a side elevational view, partially schematic, showing a modified form of the apparatus of this invention.

A modified form of the apparatus of this invention is illustrated in FIG. 7. The apparatus includes a frame 2' which corresponds generally to the frame 2 illustrated in FIGS. 1 and 6, except that the frame includes a support 48 at the forward end of the frame for mounting a coulter 50. The frame 2' also includes a support 52 for mounting a bed leveling sweep 54. The sweep 54 has a lower edge for leveling the ground surface in advance of the gauge wheel 4' and the sweep 8'.

The sweep 8' is supplied with liquid under pressure from a tank 12' and seed is supplied from a hopper 10' through the shank 6'. These components are substantially the same as described with respect to the apparatus illustrated in FIG. 1.

At the rear of the frame 2', there is a pair of support members 56 from which is suspended a bed finishing sweep 58. The position of the sweep 58 relative to the support members 56 may be adjusted by means of the slots 60 and the holes 62 through which clamping bolts 64 extend.

In operation, the apparatus as shown in FIG. 7 is mounted behind a tractor in a conventional manner and is drawn toward the right, as viewed in FIG. 7. The coulter 50 cuts through trash in the seed bed, thereby avoiding accumulation of trash at the front of the shank 6' and the sweep 8'. The bed leveling sweep 54 is preferably adjusted to strike off the bed at a predetermined depth. This arrangement allows the sweep 8' to place the seed at the depth in which optimum soil moisture conditions prevail. The bed finishing sweep 58 permits the injector sweep 8' to be operated at a greater depth, than the arrangement illustrated in FIG. 1, thereby improving the flow of soil over the sweep 8'. The final depth of the seed, however, is not determined by the depth of the sweep 8', but instead is controlled by the bed finishing sweep 58 which strikes off and levels the bed behind the sweep 8'. Thus, the final depth may be adjusted independently of the depth at which the seed is planted by the sweep 8'. The adjustment provided in the mounting of the sweep 58 allows the sweep to be tilted up at the front to give a slight crown to the finished seed bed, if desired.

Figure 8:
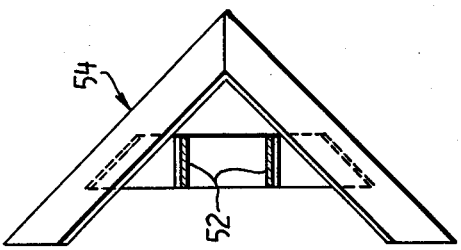
FIG. 8 is a cross-sectional view of the modified apparatus showing the bed leveling sweep.
Figure 9:
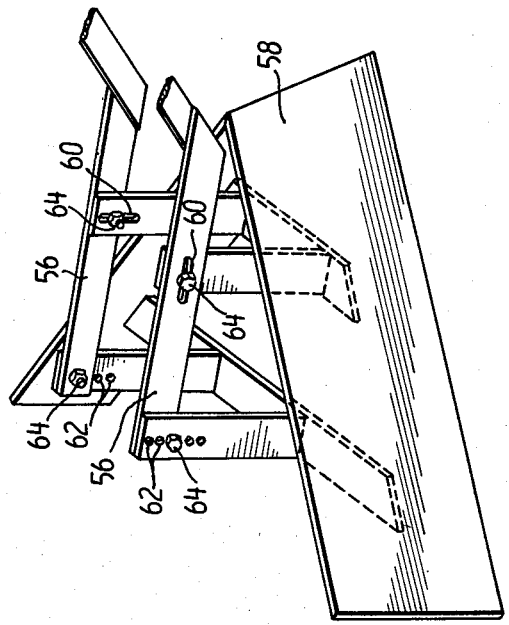
FIG. 9 is a perspective view of the bed finishing sweep on the modified apparatus.

The combination apparatus, as illustrated in FIGS. 7–9, allows flexibility in controlling soil flow, final seed depth, and yet the planting operation is accomplished in a single pass. Accordingly, the apparatus of this invention provides greater efficiency in planting.

Although this invention has been described in accordance with a preferred embodiment, with certain modifications, it is recognized that variations and changes may be made therein without departing from the invention as set forth in the claims.

What is claimed is:
1. A seed planting implement comprising:
   a supporting shank having means at the upper end of the shank for attachment to a vehicle;
   a sweep secured to the lower end of the shank, said sweep being substantially hollow and having a top wall and bottom wall spaced apart from each other and having an opening at the rearward side of said sweep;
   nozzle means mounted in said sweep, said nozzle means being spaced forwardly from said opening, and being between said top and bottom walls;
   means providing a source of fluid under pressure and including conduit means extending through the interior of said shank for conducting fluid from said source to said nozzle means;
   means providing a source of seeds spaced above the bottom wall of said sweep and including passage means in said shank for conducting seeds from said source to an aperture in the bottom wall of said sweep whereby fluids may be sprayed by said nozzle means through said sweep rearward opening and seeds may be deposited in a furrow under the sweep, as the sweep is drawn through the soil;

said sweep including laterally extending forward edges, said top wall including a wedge portion intersecting said bottom wall along said lateral edges; and said bottom wall being substantially flat, and said implement including a runner opener extending along the forward side of said shank and along said bottom wall in alignment with said bottom wall aperture.

2. A seed planting implement comprising:

a supporting shank having means at the upper end of the shank for attachment to a vehicle;

a sweep secured to the lower end of the shank, said sweep being substantially hollow and having a top wall and bottom wall spaced apart from each other and having an opening at the rearward side of said sweep;

nozzle means mounted in said sweep, said nozzle means being spaced forwardly from said opening, and being between said top and bottom walls;

means providing a source of fluid under pressure and including conduit means extending through the interior of said shank for conducting fluid from said source to said nozzle means;

means providing a source of seeds spaced above the bottom wall of said sweep and including passage means in said shank for conducting seeds from said source to an aperture in the bottom wall of said sweep whereby fluids may be sprayed by said nozzle means through said sweep rearward opening and seeds may be deposited in a furrow under the sweep, as the sweep is drawn through the soil;

said sweep including laterally extending forward edges, said top wall including a wedge portion intersecting said bottom wall along said lateral edges; and said sweep including a plurality of tines projecting rearwardly from said top wall adjacent said rearward opening.

3. A seed planting implement comprising:
a. a supporting shank having means at the upper end of the shank for attachment to a vehicle;
b. a sweep secured to the lower end of the shank, said sweep being substantially hollow and having a top wall and a bottom wall spaced apart from each other and having an opening at the rearward side of said sweep, said sweep including laterally extending forward edges, said top wall including a wedge portion intersecting said bottom wall along said lateral edges, said sweep also including a plurality of tines projecting rearwardly from said top wall adjacent said rearward opening, said sweep bottom wall including an aperture and a pair of flanges projecting downwardly therefrom, said flanges being spaced apart on opposite sides of said bottom wall aperture and spaced rearwardly from said aperture, whereby said flanges close the seed furrow as said sweep advances;
c. nozzle means mounted in said sweep, said nozzle means being spaced forwardly from said opening, and being between said top and bottom walls;
d. means providing a source of fluid under pressure and including conduit means extending through the interior of said shank for conducting fluid from said source to said nozzle means;
e. means providing a source of seeds spaced above the bottom wall of said sweep and including passage means in said shank for conducting seeds from said source to said aperture in the bottom wall of said sweep;
f. whereby fluids may be sprayed by said nozzle means through said sweep rearward opening and seeds may be deposited in a furrow under the sweep, as the sweep is drawn through the soil.

4. A seed planting implement comprising:
a frame;
means for attaching said frame to a vehicle;
a supporting shank secured at the upper end of the shank to said frame;
a sweep secured to the lower end of said shank, said sweep being substantially hollow and having a top wall and bottom wall spaced apart from each other and having an opening at the rearward side of said sweep;
nozzle means mounted in said sweep, said nozzle means being spaced forwardly from said opening, and being between said top and bottom walls;
means providing a source of fluid on said frame for supplying fluid under pressure;
conduit means extending through the interior of said shank and communicating between said nozzle means and said fluid source means; and
means providing a source of seeds on said frame spaced above the bottom wall of said sweep, passage means extending through the interior of said shank for conducting seeds from said seeds source means to an aperture in said sweep bottom wall, said aperture being spaced forwardly from said nozzle means;
means for covering seed with soil, attached to said sweep bottom wall between said aperture and said opening;
whereby seed passes through said passage means in said shank and outwardly through said aperture, and said conduit means conducts fluid separately through said shank to said nozzle means for discharge through said sweep rearward opening.

5. The seed planting implement according to claim 4 wherein said shank includes opposite side walls converging to define a forward edge, said forward edge being inclined rearwardly relative to said frame.

6. The seed planting implement according to claim 5 wherein said shank includes a transverse partition mounted in said shank between said side walls and spaced from said forward edge, said partition being substantially aligned with said aperture in said bottom wall for guiding seed and the like through said shank and outwardly through said bottom opening.

7. The seed planting implement according to claim 5 including a runner opener projecting forwardly from said shank forward edge and projecting downwardly from said bottom wall, said opener being aligned with said aperture.

8. The seed planting implement according 4 wherein said sweep includes laterally extending forward edges, said top wall including a wedge portion intersecting said bottom wall along said lateral edges, said sweep bottom wall including a pair of flanges projecting downwardly therefrom, said flanges being spaced apart on opposite sides of said bottom wall aperture, whereby said flanges close the seed furrow as said sweep advances.

9. The seed planting implement according to claim 7 wherein said sweep has a substantially greater width than said shank, said bottom wall being substantially flat and having a pair of flanges projecting downwardly therefrom, said flanges being spaced apart on opposite sides of said bottom wall aperture and spaced rearwardly from said aperture, whereby said flanges close the seed furrow as said sweep advances.

10. Seed planting apparatus comprising:
- a frame having means for attachment to a tractor, thereby allowing the frame to be drawn in a forward direction;
- a source of seeds on said frame;
- a supporting shank secured at the upper end of the shank to said frame;
- a planter sweep secured to the lower end of said shank, said planter sweep being substantially hollow and having a top wall and bottom wall spaced apart from each other and having an opening at the rearward side of said sweep, passage means extending through the interior of said shank for conducting seeds to an aperture in said sweep bottom wall;
- wheel means on said frame for controlling the depth of said planter sweep;
- a bed finishing sweep;
- means for mounting said bed finishing sweep on said frame, said bed finishing sweep being spaced rearwardly from said planter sweep;
- means for adjusting the depth of said bed finishing sweep relative to said frame independently of said wheel means; and
- said planter sweep being substantially hollow and having a top wall and bottom wall spaced apart from each other and having an opening at the rearward side of said planter sweep, and including nozzle means mounted in said planter sweep, said nozzle means being spaced forwardly from said opening, and being between said top and bottom wall, and including pressure means for supplying liquid under pressure to said nozzle means, whereby the liquid is discharged through said sweep rearward opening.

* * * * *